United States Patent [19]

Ramm et al.

[11] Patent Number: 4,778,626
[45] Date of Patent: Oct. 18, 1988

[54] PREPARATION OF PARTICULATE RADIOACTIVE WASTE MIXTURES

[75] Inventors: Eric J. Ramm, Lilli Pilli; Wilhelmus J. Buykx, Engadine; Alfred E. Ringwood, Redhill, all of Australia

[73] Assignees: Australian Nat'l Univ. of Acton; Australia Nuclear Science & Technolog Organisation, both of Australia

[21] Appl. No.: 923,621

[22] Filed: Oct. 27, 1986

[30] Foreign Application Priority Data

Nov. 4, 1985 [AU] Australia ............................ PH03244

[51] Int. Cl.$^4$ ............................ G21F 9/16; G21F 9/12
[52] U.S. Cl. .............................. 252/628; 250/506.1; 252/629; 252/633; 264/0.5; 264/332; 419/48; 419/51; 501/12
[58] Field of Search ............... 252/626, 628, 633, 629; 100/211; 222/92–94; 419/10, 42, 49, 48, 51; 220/83; 250/506.1, 507.1; 264/0.5, 125–126, 332, 319; 72/59; 425/78; 501/12

[56] References Cited

U.S. PATENT DOCUMENTS

| 4,172,807 | 10/1979 | Larker | 252/629 |
| 4,274,976 | 6/1981 | Ringwood | 264/0.5 |
| 4,409,029 | 10/1983 | Larker et al. | 252/633 |
| 4,642,204 | 2/1987 | Burström et al. | 252/629 |
| 4,645,624 | 2/1987 | Ramm et al. | 252/633 |
| 4,654,172 | 3/1987 | Matsuda et al. | 252/629 |

FOREIGN PATENT DOCUMENTS

| 0044692 | 1/1982 | European Pat. Off. | 252/629 |
| 0115311 | 8/1984 | European Pat. Off. | 252/633 |

OTHER PUBLICATIONS

Johnson, Nuclear Waste-A Better Way to Bury It?, Popular Science, May 1983, pp. 68–71.
Roy, et al., 1982, [NZP], A New Radiophase for Ceramic Nuclear Waste Forms, Mat. Res. Bull., vol. 17, pp. 585–589, Pergamon Press Ltd.
Walgate, R., 1978, Nuclear Waste May Be Stored in Synthetic Rock, Nature, vol. 274(3): 413.
Ringwood et al., 1979, The Synnoc Process: A Geochemical Approach to Nuclear Waste Immobilization, Geochemical Journal, vol. 13, pp. 141–165.

Primary Examiner—Stephen J. Lechert, Jr.
Assistant Examiner—Howard J. Locker
Attorney, Agent, or Firm—Ostrolenk, Faber, Gerb & Soffen

[57] ABSTRACT

A dry, pourable particulate mixture of nuclear waste and synthetic rock-forming components is produced by supplying the rock forming components in dry particulate form to a mixer, supplying the nuclear waste in liquid phase and operating the mixer to distribute the waste substantially uniformly through the synthetic rock components; the mixture is calcined to produce a precursor powder which is adapted to be used in a hot pressing process to form synthetic rock throughout which the radioactive nuclear waste is distributed and immobilized. A reducing gas atmosphere is preferably maintained in the calcining process stage, the gas being for example pure hydrogen or a mixture of hydrogen in nitrogen in proportions which are non-explosive. A screw type or paddle type conveyor can be used for the mixing and calcining stages although the calcining can be effected in a vertically downwardly directed tube device having associated heating means such as microwave heating.

16 Claims, 3 Drawing Sheets

PREPARATION OF PARTICULATE RADIOACTIVE WASTE MIXTURES

FIELD OF THE INVENTION

The present invention is related to a process of forming an intimate mixture of radioactive nuclear waste material and synthetic rock-forming materials. This mixture may then be transformed into synthetic rock incorporating radioactive nuclear waste by a sintering process at high temperature and pressure.

BACKGROUND OF THE INVENTION

In a known process of the this type, as described in U.S. patent application Ser. No. 524,841 assigned to the present assignees (and the corresponding European Patent No. 0044692), initial preparation of the mixture comprises forming a composite slurry in which the waste (in the form of high level radioactive nuclear waste) is mixed with synthetic rock-forming materials. This slurry is fed to a rotary kiln operating at about 750° C. in which the slurry is heated, the substantial quantity of water in the slurry vaporised and the mixture calcined to form a particulate material. The particulate material is an initimate mixture of nuclear waste material and the rock-forming materials. The rotary kiln initiates mineral formation of the synthetic rock and in one embodiment the synthetic rock materials used are those which produce in the final synthetic rock three titanate materials (hollandite $BaAl_2Ti_6O_{16}$, zirconolite $CaZrTi_2O_7$ and perovskite $CaTiO_3$), plus rutile titanium oxide $TiO_2$ and a small amount of titanium metal. The titanium metal is for reducing purposes and preferably is added in particulate form and mixed with the calcined powder before the mixture is poured into the container in which subsequently hot uniaxial pressing takes place. Preferably, the container has a bellows-like wall.

The present invention is directed to new and useful alternatives which avoid disadvantages inherent in the use of a wet slurry for mixing the materials initially; it has now been found that a sufficiently intimate mixture of nuclear waste material and synthetic rock-forming materials can be achieved without wet slurry mixing.

It is now pointed out that some of the disadvantages of wet slurry mixing include the following:

(a) To enable the composite slurry to be pumped through the associated equipment, it is necessary for the slurry to have a high water content. Therefore, the process creates, as an undesirable by-product, large amounts of high level radioactive contaminated water which must be treated further to diminish its hazardous nature.

(b) Much larger and more complex handling equipment is required in an active cell. This results in significant expense and much greater capital costs for an active cell, the cost of which is dependent on the volume of the cell.

(c) A lengthy rotary kiln is required since a substantial part of the kiln is devoted to removing water in vapor form from the slurry before the calcining step in the process commences. Capital cost penalties are inherent in this feature.

(d) A relatively expensive off-gas treatment system is required to deal with the considerable volumes of gases emerging from the rotary kiln.

In general terms the present invention is directed at least partially towards avoiding disadvantages now noted in the slurry process and is aimed at providing a simplified process for producing the particulate material for loading into the containers in which the particulate material is to be hot pressed. Although application of the present invention to the production of particulate material for a hot uniaxial pressing is an important application of the present invention, the present invention is not limited in this regard and may equally be applied to the production of material for the formation of synthetic rock incorporating nuclear waste by other processes such as hot isostatic processes.

SUMMARY OF THE INVENTION

According to one aspect of the present invention, there is provided a process for providing particulate material suitable for the formation of synthetic rock under heat and pressure, the process comprising supplying synthetic rock-forming components in dry particulate form to a mixer, supplying radioactive nuclear waste in liquid phase to the particulate components in the mixer and operating the mixer to cause the waste to be substantially uniformly distributed through the synthetic rock components, and calcining particulate material discharged from the mixer to produce in powder form a precursor comprising synthetic rock-forming components and radioactive nuclear waste distributed therethrough, the precursor being adapted to be used in a hot pressing process to form synthetic rock throughout which the radioactive nuclear waste is distributed and immobilized. In this specification the nuclear waste (such as high level radioactive nuclear waste from spent fuel rods of a nuclear reactor) is referred to as being added in the liquid phase. The expression "liquid phase" is to be understood as including not only solutions but also other dispersions in a liquid carrier such as suspensions.

Various further inventive features may be included in different embodiments of the invention as described hereinafter. Broadly, however, the invention permits the use of synthetic rock components already in a dry particulate form, these components being prepared by any convenient process outside an active cell thereby minimising expensive active cell space, removing restrictions concerning processes operated by remote manipulators and facilitating economic production of the components. Preferably the components are in a readily pourable form. It has been found that a highly uniform intimate dispersion of the nuclear waste through the synthetic rock can be achieved and furthermore the spacial requirements and off-gas requirements within the active cell are substantially reduced. In a preferred embodiment of the invention, the mixer is a continuous mixer advancing feedstock from an inlet to an outlet and the radioactive waste is introduced progressively along the mixer path, the mixer including a heater to maintain the particulate material in a relatively dry state along the path, and an off-gas system being provided for collecting and processing water vapor and other vaporized components and entrained particulate matter from the radioactive waste synthetic rock mixture.

The form of the mixer may, with advantage, be chosen from the group comprising a screw conveyor mixer and a rotating paddle mixer having an approximately horizontally directed mixing path.

Heating in the mixer can be effected by any suitable means including induction heating, hot gas, oil or microwave heating.

Preferably, the calcining step is effected in a calcining stage downstream of the mixer at which temperatures substantially greater than those prevailing in the mixer are used; for example, in the mixer temperatures of about 300° C. may be achieved whereas in the calcining stage temperatures of about 750° C. are required.

The calcining stage may be conducted in a rotary kiln or alternatively may be effected in an apparatus selected from the group consisting of a screw conveyor, a paddle-type conveyor (which may be an extension of the mixer portion of the apparatus), a downwardly directed multiple parallel tube device leading to a receiving hopper and a downwardly directed tube device having one or just a small number of relatively large diameter tubes in which heating takes place.

Advantageously the calcined particulate material is received from the calcining stage and is conveyed by a screw conveyor to a filling station for containers for the hot pressing operation. Since the particulate material must be poured into an open topped container, it is very desirable to maintain the form of the particulate material to facilitate very reliable pouring bearing in mind that the process must be conducted with manipulators in an active cell. Embodiments of the invention may facilitate the production of the particulate material in a convenient form for this purpose.

In the calcining stage, heat may be applied by any convenient means such as resistance heating, inductive heating, hot gas heating and microwave heating. Particularly if a relatively wide downwardly directed tube calciner is used, microwave heating may be an effective means of providing substantially uniform calcining temperatures through the body of material and since a relatively wide tube structure is utilized this can be advantageous in maintaining flow of the particulate material so that reliable operation of the apparatus is achieved.

There are various preferred embodiments with respect to the initial preparation of the synthetic rock components outside the active cell. The advantageous embodiments involving further inventive features include the following:

(a) The synthetic rock components are initially formed in an aqueous slurry which is dewatered to form a damp cake of solid particles which is then dried at relatively low temperature (e.g. 130° C.) to form a dry powder. This powder is conditioned if necessary to be in a flowable form for supply to the mixing apparatus.

(b) The powder produced by the process in (a) above may be additionally processed by precompaction to take on a granulated form and this product is then presintered at a low temperature e.g. about 300° C. to improve the mechanical strength of the granules which then provides the feedstock to the mixer. This feedstock has a readily flowable form yet can be produced relatively easily and economically.

(c) The process of (b) above may be further modified to provide the granules in spheridised form to further enhance the flow characteristics of the product.

(d) A slurry of synthetic rock components may be spray dried to form fine particles which are then subjected to a presintering at low temperature e.g. about 300° C. to provide powder feedstock for the mixer.

(e) A highly pourable powder may be formed by a sol-gel process followed by a presintering.

Yet a further important and additional inventive feature now proposed concerns the control of the gases in contact with the mixture of radioactive waste and synthetic rock component during the calcining stage. This inventive feature can be incorporated in a preferred embodiment of the dry mixing invention described herein but may also be applicable as an improvement to the process of applying a mixed slurry to a rotary kiln as described in the applicants' above-mentioned patent application. More particularly the control of the gaseous atmosphere concerns the maintenance of a reducing gas of a non-explosive constitution which is passed over the material during calcining. It is thought that during calcining, nitrates of the radioactive waste decompose to provide some nitrous oxide gas in sufficient quantities during the high temperature portion of the calcining step so that adverse effects may occur in the synthetic rock structure.

Preferably this inventive aspect is implemented by having a gas which comprises substantially pure hydrogen; the gas is preferably pure hydrogen but could be a mixture of hydrogen with an inert gas such as nitrogen in which case the mixture must comprise at least 80% hydrogen to avoid an explosive mixture being utilized.

This gas is passed continuously through the calciner and mixer and takes away any off-gases including any radioactive gases that might be produced, the gases then being processed through a filtration system to remove any radioactive components.

One advantage of using pure hydrogen is a reduction of residence time (from 60 minutes to 10 minutes) in the calciner, thereby reducing the length of the calciner. Other advantages are the maintenance of low oxygen partial pressure in the calciner and minimum ruthenium volatilisation in drying and calcination leading to improved synthetic rock quality and less contamination of the off-gas system.

According to a second aspect of the invention, there is provided apparatus having means for implementing the process steps described above in any one of the embodiments and in a third aspect of the invention there is provided a particulate material produced by the process or apparatus.

BRIEF DESCRIPTION OF THE DRAWINGS

The invention will be further described, by way of example, with reference to the accompanying drawings of which.

DETAILED DESCRIPTION OF THE DRAWINGS

Figure 1:
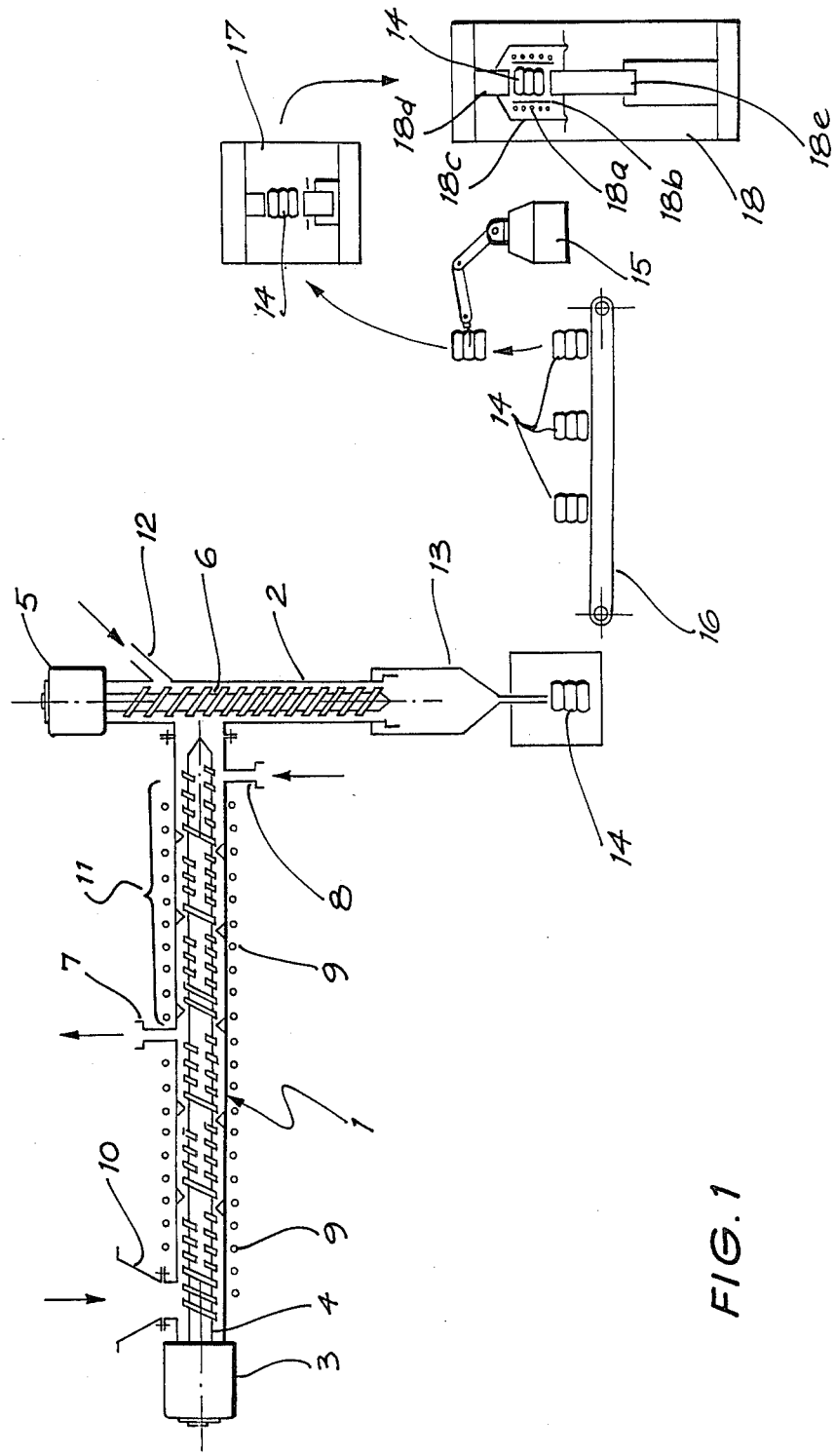
FIG. 1 is a schematic diagram of one form of inventive apparatus for carrying out a process according to a first embodiment of the present invention.

Each figure shows an apparatus for use in a process for immobilizing high level radioactive nuclear waste in a synthetic rock. FIG. 1 shows an apparatus having a horizontal screw conveyor 1 for mixing and calcining high level nuclear waste and synthetic rock forming components which are introduced through hopper 10, and for supplying the product to a vertically downwardly directed second screw conveyor 2 for mixing in a small proportion of titanium powder through an inlet 12 and then discharging the resultant mixture into a receiving hopper 13. Subsequent stages, described in more detail below, cause the powder to be subjected to high temperature and pressure to form a synthetic rock in which the high level radioactive waste is immobilised.

At the input end of the first conveyor 1, a motor 3 is arranged to drive an elongated mixing and conveying screw 4 which co-operates with a housing of the conveyor. Similarly, and at the top of the second conveyor 2, a second motor 5 is arranged to drive a second screw 6 which conveys material from the top of the conveyor 2 to the hopper 13.

At a location approximately halfway along the first conveyor 1, a gas outlet 7 is provided for the removal of gases emitted within the conveyor 1 along with a purging gas flow of hydrogen and nitrogen (or more preferably pure hydrogen) which is introduced in a countercurrent manner through an inlet 8 at the downstream end of the conveyor 1. Substantially pure hydrogen is the preferred purging gas since it is non-explosive and has an advantageous reducing effect on the particles of material during the calcining step.

The pure hydrogen or substantially pure hydrogen allows the use of a short screw conveyor in the calcining region.

Along the length of the first conveyor 1 a heating element 9 (such as an induction coil) is provided. This serves a dual function. Firstly, the heating element 9 causes evaporation of any water present in the supply powder, which consists of synthetic rock forming components and nuclear waste. This particulate material normally will be initially damp. Secondly, the heating element 9 causes calcination of the powder particularly towards the downstream end of the conveyor so that a dry particulate structure exists in the powder discharged; during calcination initiation has taken place of the formation of mineral phases in the synthetic rock components.

In the drawing the calcining portion 11 of the conveyor is indicated near the downstream end.

Particulate material discharged into the second conveyor 2 is moved gradually downwardly and intimately mixed with titanium powder added through an inlet 12.

The particulate material received in hopper 13 is available for supply to the hot pressing operation which in this preferred embodiment is conducted generally as described in the applicants' abovementioned prior patent specification using a metal container 14 having a bellows-like cylindrical wall. As shown in FIG. 1, each container 14 is filled with mixture from hopper 13 and then transported from below the discharge hopper 13 by a conveyor 16 through a series of stations A, B and C in which successively each filled container receives a lid and is welded closed, decontaminated and weighed. A manipulator 15 then transfers each container 14 in turn to a pre-compaction press 17 where the container is partially uniaxially compressed. Subsequently, each partially-compressed container 14 is transferred to a hot uniaxial pressing station 18 at which the bellows-type container 14 is heated to about 1200° C. and then uniaxial pressed at 14–21 MPa to form in the container synthetic rock with high level radioactive nuclear waste immobilized therein. The pressing stage has an induction heating coil 18a, a metal susceptor sleeve 18b, a shroud 18c, a fixed upper abutment 18d and a hydraulic ram 18e.

Figure 2:
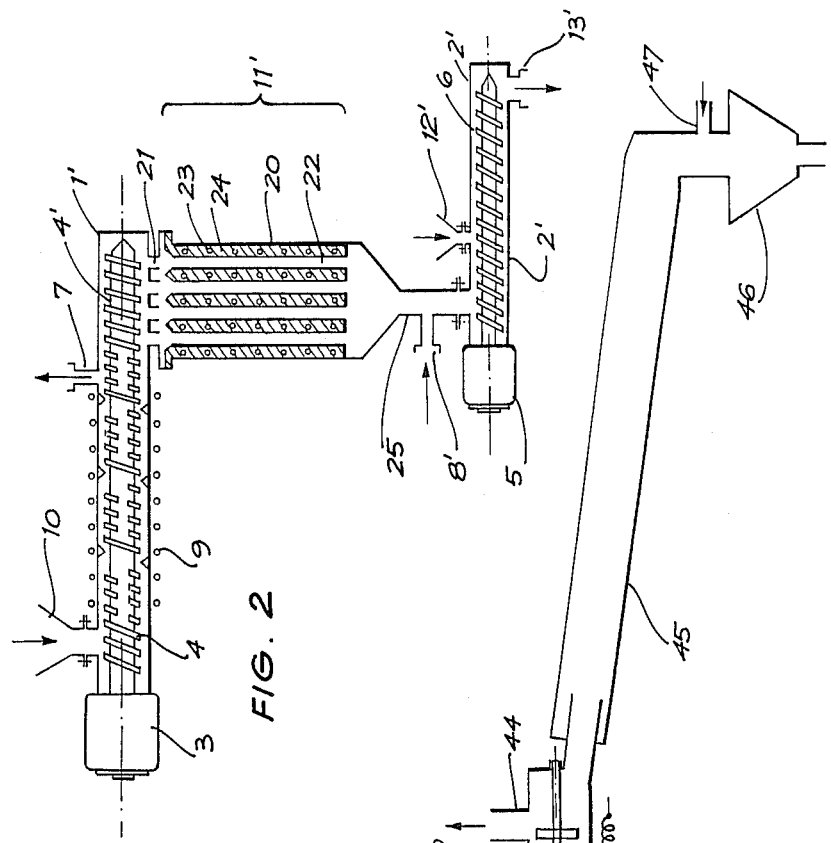
FIG. 2 is a schematic diagram of a second form of inventive apparatus for carrying out a process according to a second embodiment of the present invention.

FIG. 2 illustrates an embodiment which includes modifications only upstream of the container filling stage. Like reference numerals have been used for parts corresponding to those shown in FIG. 1 and only the distinctions will now be described.

Referring now to FIG. 2, the two chamber apparatus of FIG. 1 is modified to provide a three chamber arrangement in which the calciner section 11' is formed in a vertical parallel tube calciner 20. The heating element 9 associated with the first conveyor 1' simply has an effect of drying the feedstock and a downstream end portion 4' of the screw conveyor distributes the feedstock through a series of apertures 21 for distributing the feedstock into the vertical tubes 22. The vertical tubes are spaced from one another and surrounded by respective heating coils 23 imbedded in refractory material 24.

Calcined powder is discharged through the calciner section 11' into a discharge hopper 25, the downstream throat of which incorporates the purge gas inlet 8'. The purge gas thus passes up through the calciner section 11' and into the downstream end of the conveyor 1'.

In FIG. 2, the discharge screw conveyor instead of being vertical, as in FIG. 1 is a horizontal conveyor 2' having an inlet 12' for titanium powder and a downward discharge 13' for discharging the mixed powder.

In the embodiment of FIG. 2, the form of the inlet manifold 21 can be altered such that the conveyor 1' discharges into a narrow neck of an inlet manifold which flares outwardly to a width corresponding to that of the vertical tube assembly.

Figure 3:
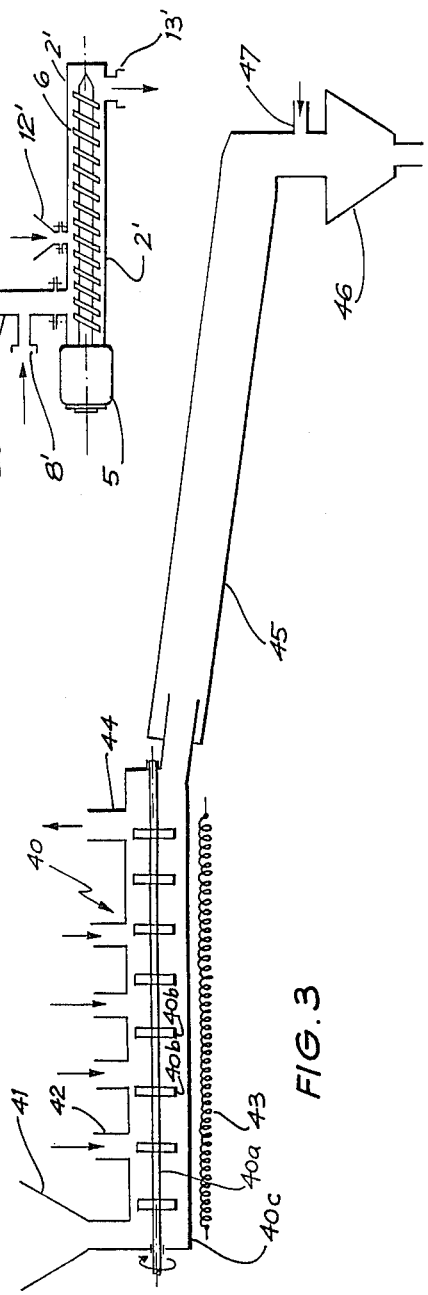
FIG. 3 is a schematic diagram of a third embodiment of the invention.

Referring now to FIG. 3, there is schematically shown an alternative embodiment in which, instead of using a screw conveyor, a paddle-type conveyor 40 is used. The conveyor has a central shaft 40a, paddes 40b spaced therealong for mixing and advancing powder in the conveyor, and a cylindrical housing 40c. The housing has at its upstream end an inlet hopper 41 for receiving synthetic rock forming components in the form of granules or in a form derived from a sol-gel process, this material being conveyed progressively downstream to be mixed gradually with high level nuclear waste admitted in liquid phase through a series of spaced inlets 42. An intimate mixure is provided and operation of a heater 43 causes water components of the high level waste to be vaporized and discharged through gas outlet 44 which is connected to a low pressure gas filtration system.

The intimate dry mixture of high level waste and synthetic rock components is discharged into a rotary kiln 45 in which calcining takes place, the product being discharged into a hopper 46. A reducing gas flow is passed from inlet 47 through the calciner to discharge through outlet 44.

Figure 4:
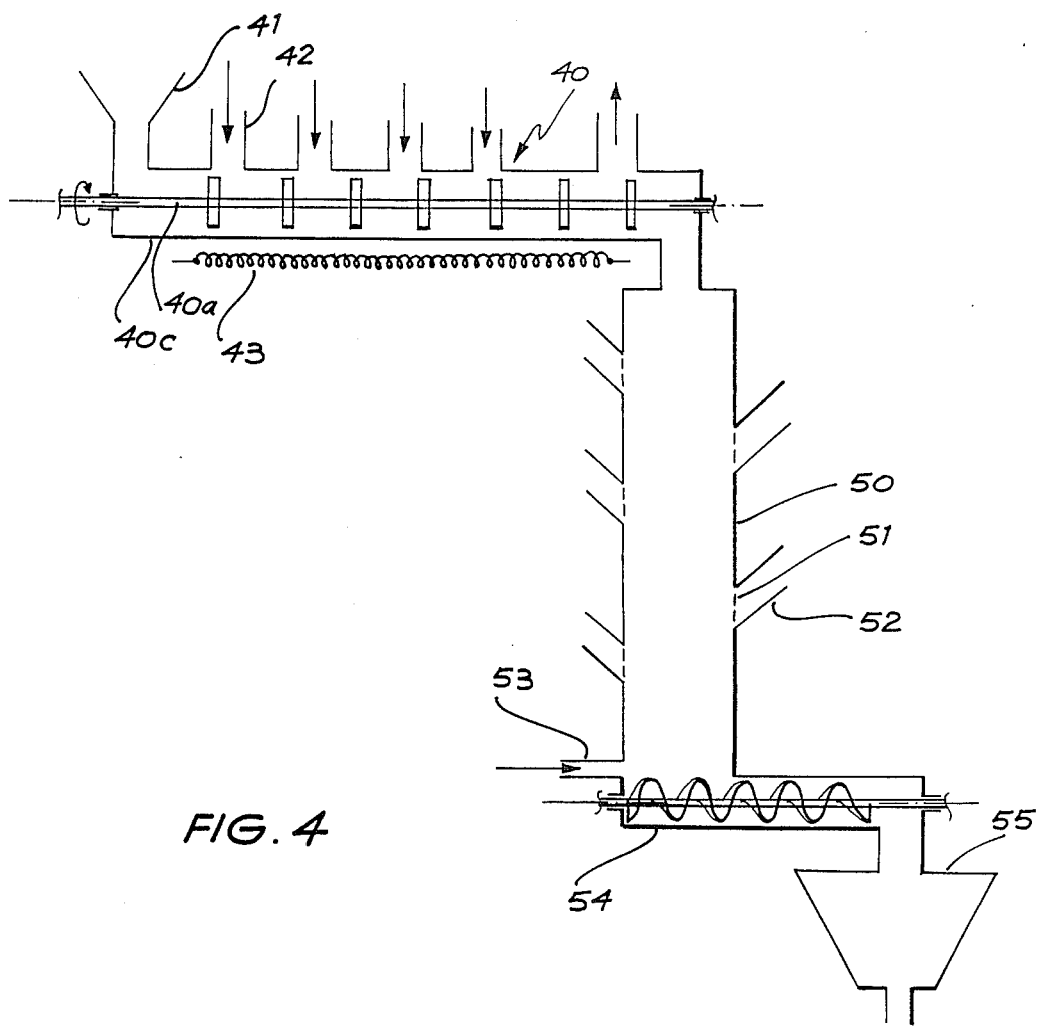
FIG. 4 is a schematic view of a fourth embodiment of the invention.

Yet a further embodiment is shown in FIG. 4. This embodiment is similar to FIG. 3 except that the rotary kiln is replaced by a wide single tube vertical calciner 50 having suitable windows 51 connected to respective microwave energy guides 52 for calcining the product as it moves down in a column through the calciner. At the base of the calciner, an inlet 53 is provided for a purge gas (of pure hydrogen or a mixture of approximately 3% hydrogen in nitrogen). In FIG. 4, there is a horizontal screw conveyor 54 for discharging the granulated product into a receiving hopper 55 from which bellows containers may be filled for the subsequent stages of the process. The conveyor 54 preferably has a feed hopper for titanium metal powder corresponding to the inlet 12' shown in FIG. 2.

The above described embodiments advantageously provide for intimate mixing of high level radioactive nuclear waste (normally supplied as a suspension/solution) with synthetic rock forming powders which can be economically and conveniently handled in dry form and excellent uniformity of dispersion of the nuclear waste has been found in the resultant synthetic rock structure. Since a substantially dry process is involved, much less water is present initially, and because all water requires evaporation in a stage immediately prior to the calcining step there is the advantage of little waste to evaporate. The relatively dry process permits simplification and a reduction of demand placed on an off-gas filtration system. Most importantly a relatively simple process and apparatus can be designed and this is very important for successful long-term active cell operations.

We claim:

1. A process for providing particulate material suitable for the formation of synthetic rock under heat and pressure, comprising:
    supplying synthetic rock-forming components in dry particulate form to a continuous mixer adapted to advance particulate material along a mixer path from an inlet to an outlet;
    supplying radioactive nuclear waste in liquid phase to the particulate components at locations spaced along the mixer path and operating the mixer to cause the waste to be substantially uniformly distributed through the synthetic rock components and at the same time heating the synthetic rock components and waste to maintain a substantially dry particulate material along said mixer path;
    calcining the substantially dry particulate material to produce in powder form a precursor comprising synthetic rock forming components and radioactive nuclear waste distributed therethrough, the precursor being adapted to be used in a hot pressing process to form synthetic rock throughout which the radioactive nuclear waste is distributed and immobilized.

2. A process as claimed in claim 1 wherein an off-gas system is provided and operated for collecting and processing water vapor, other vaporized components and entrained particulate matter from the radioactive waste synthetic rock mixture.

3. A process as claimed in claim 1 wherein the mixer used is selected from the group consisting of a screw conveyor mixer and a rotating paddle, each such mixer having an approximately horizontally directed mixing path.

4. A process as claimed in claim 1, and wherein the calcining is effected in a calcining stage downstream of the mixer at temperatures substantially greater than those prevailing in the mixer.

5. A process as claimed in claim 4 and wherein temperatures of the order of 300° C. are used in the mixer and temperatures of the order of 750° C. are used in the calcining stage.

6. A process as claimed in claim 4 wherein the calcining stage is effected in a rotary kiln downstream of a separate apparatus for effecting the mixing stage.

7. A process as claimed in claim 1 wherein the calcining stage is provided at a downstream portion of a substantially horizontal conveyor having rotating means for advancing the particulate material, the conveyor having an upstream portion which provides the mixing stage.

8. A process as claimed in claim 1 wherein the calcining stage is effected in a tubular calciner having a substantially vertically downwardly directed duct.

9. A process as claimed in claim 8 and wherein the calcining stage includes the use of microwave heating means.

10. A process as claimed in claim 1 and further comprising the preliminary step of forming the synthetic rock components as an aqueous slurry dewatered to form a damp cake of solid particles, drying said damp cake at relatively low temperatures compared with those used in the subsequent process stages, and manipulating the powder to be in a flowable form.

11. A process as claimed in claim 10, and wherein the process includes precompaction of said damp cake to form the synthetic rock components into granulated form, and presintering at a temperature of the order of 300° C. to improve the mechanical strength of the granules, whereby a flowable product is provided.

12. A process as claimed in claim 1 further comprising the preliminary step of forming the synthetic rock components into a slurry and spray drying the slurry to form fine particles, and presintering the fine particles at temperatures of the order of 300° C. to provide a feed stock in powder form for said mixer.

13. A process as claimed in claim 1, further comprising a preliminary step wherein the synthetic rock components are formed in a sol-gel process, followed by sintering the material at temperatures of the order of 300° C. to produce a flowable powder.

14. A process as claimed in claim 1, further comprising maintaining a non-explosive reducing gas atmosphere in the calcining stage and circulating the gas through an off-gas system and providing operating means to remove any radioactive components in the off-gas.

15. A process as claimed in claim 14 and wherein the reducing gas is selected from the group consisting of substantially pure hydrogen, a mixture of hydrogen and nitrogen and comprising at least 80% hydrogen, and a mixture of hydrogen and nitrogen comprising approximately 3% hydrogen, all percentages being by weight.

16. A process as claimed in claim 1 further comprising:
    (a) filling bellows-like containers in sequence with the calcined product in a pouring process, the containers each having a bellows-like cylindrical side wall;
    (b) closing each bellows-like container in turn with a lid and welding the container closed; and,
    (c) effecting hot uniaxial pressing of each container in turn to cause densification of the contents of the container and the formation of synthetic rock with the radioactive waste immobilized therethrough.

* * * * *